F. S. CHAPMAN.
SOLDERING DEVICE.
APPLICATION FILED OCT. 16, 1908.
934,711.
Patented Sept. 21, 1909.
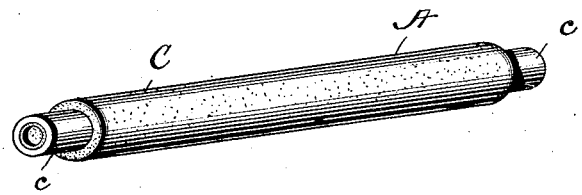
Fig. 1.
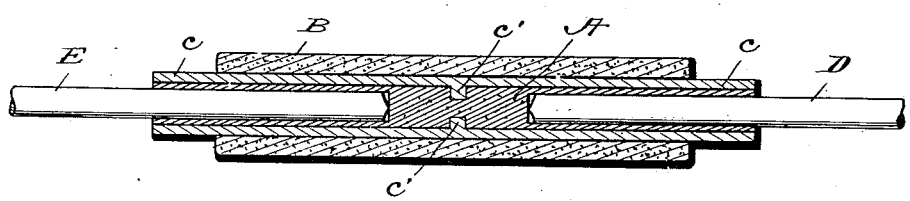
Fig. 2.
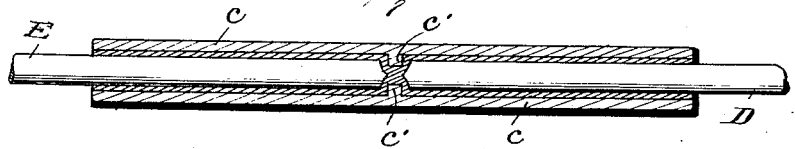
Fig. 3.
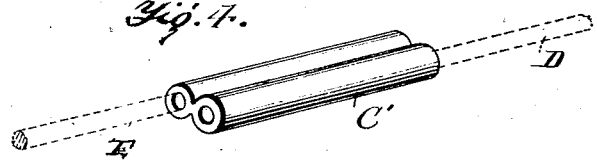
Fig. 4.
Fig. 6.
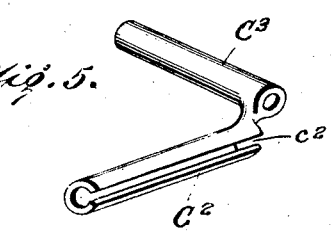
Fig. 5.
WITNESSES
L. H. Schmidt
L. A. Stanley
INVENTOR
FRANK S. CHAPMAN,
BY Munn & Co.
ATTORNEYS

UNITED STATES PATENT OFFICE.

FRANK SPENCER CHAPMAN, OF KENTON, OHIO.

SOLDERING DEVICE.

934,711. Specification of Letters Patent. Patented Sept. 21, 1909.

Application filed October 16, 1908. Serial No. 457,976.

REISSUED

*To all whom it may concern:*

Be it known that I, FRANK SPENCER CHAPMAN, a citizen of the United States, and a resident of Kenton, in the county of Hardin and State of Ohio, have made certain new and useful Improvements in Soldering Devices, of which the following is a specification.

My invention relates to improvements in means for soldering metallic parts and is especially applicable to those joints used in electrical constructions which require a good metallic contact in order to provide against undue resistance to the electric current in the conductors at their point of union.

An object of my invention is to provide a device which does away with the necessity of using a furnace or torch or a soldering iron.

A further object of my invention is to provide a self soldering union for electrical conductors which may be easily applied and which requires no tools for the completion of a good joint.

Other objects and advantages will appear in the following specification and will be particularly pointed out in the appended claims.

My invention is illustrated in the accompanying drawings, in which—

Figure 1 is a view of a union embodying my invention. Fig. 2 is an enlarged sectional view of the union showing two wires before soldering. Fig. 3 is a similar view showing the completed joint. Fig. 4 is a modified form of union. Fig. 5 is a view of a branch union, and Fig. 6 is a sectional view of a piece of the soldering material.

In carrying out my invention I take a sheet of solder A which may be ordinary lead and tin solder, brazing material, zinc, or any suitable material and cover it with a layer B of a compound having high calorific power when burned. This layer is preferably a mixture of potassium chlorate, nitrate of strontium and powdered shellac in suitable proportions. This is made into a paste and applied to the solder. The resulting sheet may be rolled into sticks or cut up into strips as desired.

In using the solder, the surface of the metal to be soldered is first scraped and a flux applied in the usual manner. A piece of the solder with its inflammable coating is then placed on the joint and the heating compound is lighted with a match. It ignites readily and gives an intense heat which melts the solder, thus causing it to adhere to the surface to be soldered, and doing away with the need of either furnace or soldering iron.

In joining the ends of two wires I make use of a union C. This consists of a metal tube $c$ having inwardly projecting lugs or flanges $c'$ near its central part. The tube is filled with solder A, which is cored out at both ends to permit the entrance of the ends of the wires D and E. Outside of the tube there is a coating of heating material B. In effecting the joint the wires are first inserted and then the compound B is ignited. During its combustion the heat is conducted to the solder within, which melts and allows the wires to be pushed together until they meet the stops $c'$. The solder is squeezed around the ends of the wires and comes into intimate contact with them. After cooling the joint presents the appearance shown in Fig. 3 in which the wires D and E are embedded fast in the metal.

Instead of the union just described I may use one like that in Fig. 4. This consists of two integral tubes $C'$ having an inner lining of solder and an outer lining of heating material. The wires D and E are inserted into the tubes from their opposite ends and are soldered in the manner already described.

In Fig. 5 I have shown a union for a branch wire. This consists of a split tube $C^2$ and an integral tube $C^3$ disposed at an angle thereto. In use the main wire may be placed in the tube $C^2$ by passing it through the slit $c^2$, while the end of the branch wire is placed in the tube $C^3$. The inflammable coating is ignited and the linings of solder are melted and flow over the wires, thus forming a good conducting joint.

I claim—

1. In a soldering device, a metallic tube having an interior lining of soldering material and an outer coating of inflammable material.

2. In a soldering device, a metallic tube provided with interior stops, a coating of inflammable material on the outside of said tube, and a lining of soldering material on the inside of said tube.

3. As an article of manufacture, a soldering material and a coating of inflammable material for fusing said soldering material.

FRANK SPENCER CHAPMAN.

Witnesses:
C. W. FAULKNER,
HOWARD R. SMITH.